US005886418A

United States Patent [19]

Kondo et al.

[11] Patent Number: 5,886,418

[45] Date of Patent: Mar. 23, 1999

[54] MARINE POWER DEVICE

[75] Inventors: Tetsuya Kondo; Narutoshi Aoki; Tsuneaki Endou, all of Numazu, Japan

[73] Assignee: Kokusan Denki Co., Ltd., Shizuoka-ken, Japan

[21] Appl. No.: 771,237

[22] Filed: Dec. 20, 1996

[51] Int. Cl.$^{6}$ ........................................ B60L 1/00

[52] U.S. Cl. ........................................ 307/9.1; 320/134

[58] Field of Search ........................................ 307/9.1, 10.1, 307/10.7, 116, 11, 29, 38, 39; 320/128, 134, 136; 123/179.28; 440/84, 85, 900; 290/47; 322/62–64

[56] References Cited

U.S. PATENT DOCUMENTS

| | | | |
|---|---|---|---|
| 3,763,415 | 10/1973 | Ownby | 307/10.1 |
| 5,239,203 | 8/1993 | Thorngren | 307/116 |
| 5,523,547 | 6/1996 | Miller | 307/10.7 |
| 5,635,771 | 6/1997 | Mertl et al. | 307/10.1 |

*Primary Examiner*—Richard T. Elms
*Attorney, Agent, or Firm*—Pearne, Gordon, McCoy & Granger LLP

[57] ABSTRACT

A marine power device capable of preventing a failure in actuation of constantly-driven loads required to be constantly actuated for continuing operation of an internal combustion engine, when various loads are actuated using both a magneto driven by the engine and a battery driven by the magneto as a power supply in a ship in which an outboard motor is used as a propelling equipment. The device includes a switch which functions to separate occasionally-driven loads increased in power consumption and the battery from the magneto when the battery is reduced in output voltage thereof to a level of failing to actuate the constantly-driven loads due to connection of the occasionally-driven loads to the battery or overdischarge of the battery. The switch is arranged at a position which does not affect flowing of a drive current fed from the magneto to the constantly-driven loads.

7 Claims, 6 Drawing Sheets

MARINE POWER DEVICE

BACKGROUND OF THE INVENTION

This invention relates to a marine power device, and more particularly to a marine power device for driving various kinds of electric units mounted on a ship in which an outboard motor is used as a propelling equipment by means of a power supply including a battery and a magneto driven by an engine.

In a ship in which an outboard motor is used as a propelling equipment, a power device including a power supply consisting of a magneto driven by an engine and a battery is used for driving various loads. The loads driven by the power device include constantly-driven loads such as an ignition unit for an internal combustion engine, a fuel injection control unit adapted to control a fuel injector for feeding the internal combustion engine with fuel, a pump motor adapted to drive a fuel pump for feeding the injector with fuel and the like, as well as occasionally-driven loads driven as required.

An outboard boat which is a motor boat equipped with an outboard motor often encounters problems such as a decrease in navigation speed thereof due to an action of an underwater portion of the boat as a resistance during high-speed navigation thereof, planing of a bow of the boat during the high-speed navigation and the like. In order to avoid such problems, an inclination mechanism called a trim mechanism is provided, which is constructed so as to incline the propelling equipment by means of a hydraulic cylinder. For arrangement of such an inclination mechanism, it is required that a motor which is called a trim motor and functions to actuate a hydraulic pump for feeding the hydraulic cylinder with hydraulic fluid is driven in the form of an occasionally-driven load.

Also, the outboard boat is often mounted thereon with a hydraulic lift for lifting the whole outboard motor during navigation of the boat in a shoal or the like. In this instance, it is also required that the motor which functions to actuate the pump for applying a hydraulic pressure to the hydraulic cylinder is driven as another occasionally-driven load.

Further, in an outboard boat which is mounted thereon with a plurality of outboard motors, a power assisting unit is often arranged for assisting operation of a steering wheel by means of a hydraulic pressure, to thereby reduce force required for operating the steering wheel. In such a case, it is required that a motor which acts to actuate a pump for applying a hydraulic pressure to the power assisting unit is driven as a further occasionally-driven load.

Other occasionally-driven loads associated with the outboard boat include a start motor for starting the engine, a motor for actuating a bilge pump for discharging bilge-water collected in the boat, a motor for actuating a winding machine for winding up an anchor or a net, a lamp and the like.

A conventional marine power device includes a magneto driven by the internal combustion engine, a DC power circuit which includes a rectification circuit for rectifying an AC output of the magneto and a voltage regulator for restricting an output voltage thereof to a set level or below and is adapted to output a DC voltage limited to a set level or below, and a battery charged by an output of the DC power circuit, wherein such constantly-driven loads and occasionally-driven loads as described above are driven by an output voltage of the battery.

Of the loads driven by the marine power device, the occasionally-driven loads such as the motors which act to drive the pump for applying a hydraulic pressure to the trim mechanism, the lift, the power assisting unit for the steering wheel and the motors for driving the bilge pump and winding machine generally consume a current in a large amount. Thus, when the occasionally-driven loads are connected to the battery while the battery is kept at a state approximating overdischarge, the marine power device fails to normally actuate the constantly-driven loads such as the motors for the pump for feeding the fuel injection control unit and fuel injector with fuel, leading to a reduction in output of the engine and/or interruption of the engine. In particular, a two-cycle engine wherein lubricating oil is fed to the engine while being mixed with fuel often causes seizure thereof because shortage of fed fuel due to a decrease in voltage of the battery leads to shortage of lubricating oil.

SUMMARY OF THE INVENTION

The present invention has been made in view of the foregoing disadvantage of the prior art.

Accordingly, it is an object of the present invention to provide a marine power device which is capable of satisfactorily driving constantly-driven loads required for continuing operation of an internal combustion engine even when a voltage of a battery is substantially decreased.

The present invention is applied to a power device for driving or actuating various kinds of loads mounted on a outboard boat or a ship in which an outboard motor is used as a propelling equipment therefor. A power device according to the present invention includes a magneto arranged so as to be driven by an internal combustion engine used as a prime mover for an outboard motor and constructed so as to feed a drive current to constantly-driven loads kept under constantly-driven conditions for continuing operation of the internal combustion engine and occasionally-driven loads driven as required, a battery arranged so as to be charged by an output of the magneto and constructed so as to feed a drive current to the constantly-driven loads and occasionally-driven loads, and a switch means for separating the battery and at least one of the occasionally-driven loads from the magneto so as to limit the magnitude of load applied to the magneto to a value equal to or below the maximum limitation level of the load which can be appropriately driven by the magneto when there is likelihood that the battery is decreased in output voltage thereof, to thereby fail to feed the constantly-driven loads with a drive current required. The switch means is arranged at a position which does not affect flowing of a drive current fed from a side of the magneto to the constantly-driven loads.

As described above, in the present invention, the switch means may be arranged in a manner to act to separate the battery and at least one of the occasionally-driven loads from the magneto so as to restrict the magnitude of load applied to the magneto to a value equal to or below the maximum limitation level of the load which can be appropriately driven by the magneto, when there is likelihood that an output voltage of the battery is reduced to a level of failing to feed the constantly-driven loads with a drive current required. Such arrangement permits the constantly-driven loads to be effectively actuated by means of an output of the magneto irrespective of a reduction in output voltage of the battery, to thereby eliminate a failure in actuation of the constantly-driven loads, resulting in preventing interruption of the engine.

Separation of the battery and at least one of the occasionally-driven loads from the magneto for the purpose of restricting the magnitude of load applied to the magneto to a value equal to or below the maximum limitation level of the load which can be appropriately driven by the magneto may be attained, for example, by preselecting at least one specific occasionally-driven load from the occasionally-driven loads driven only for a limited period of time and keeping the switch means turned off while the specific occasionally-driven load is actuated. In this instance, the specific occasionally-driven load is a load which is likely to cause a voltage across the battery to be reduced below a level required for driving the constantly-driven loads when it is actuated.

Such construction causes the battery to be separated from the magneto during actuation of the specific occasionally-driven load even when the battery is at a normal state, resulting in the battery being kept from being charged. However, actuation of the specific occasionally-driven load is carried out only for a limited period of time, to thereby be prevented from adversely affecting charging of the battery.

Also, the present invention may be actually practiced in such a manner that such separation of the battery and at least one of the occasionally-driven loads from the magneto is carried out when a voltage across the battery is detected to be below a set level, to thereby restrict the magnitude of load applied to the magneto to a value equal to or below the maximum limitation level of the load which can be appropriately driven by the magneto.

In the present invention, when the switch means is open, the battery and at least one of the occasionally-driven loads may be separated from the magneto, to thereby restrict the magnitude of load applied to the magneto to a value equal to or below the maximum limitation level of the load which can be appropriately driven by the magneto. In this instance, when it is preferentially desired to continue operation of the internal combustion engine, all occasionally-driven loads are preferably separated from the magneto together with the battery, to thereby reduce load of the magneto. Such construction fails to actuate the occasionally-driven loads separated from the magneto during opening of the switch means when the battery is exhausted. However, in an outboard boat, a failure to continue operation of the engine leads to a failure in return voyage, resulting in being dangerous to life; therefore, it is highly important that continuing of operation of the internal combustion engine takes preference over continuing of actuation of the occasionally-driven loads.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a marine power device according to the present invention will be described hereinafter with reference to the accompanying drawings.

Figure 6A:
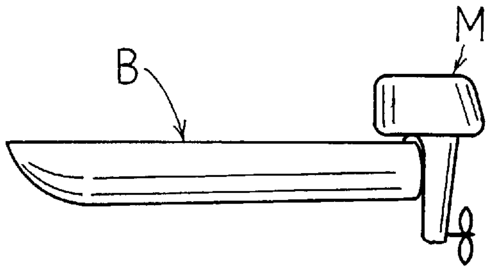
FIG. 6A is a schematic side elevation view showing an outboard boat equipped with a trim mechanism, wherein the trim mechanism is kept at a state prior to actuation thereof.

In general, the present invention is applied to a power device for driving various kinds of electric loads mounted on a ship including a hull B and an outboard motor M mounted on the hull B as shown in FIG. 6A.

Figure 1:
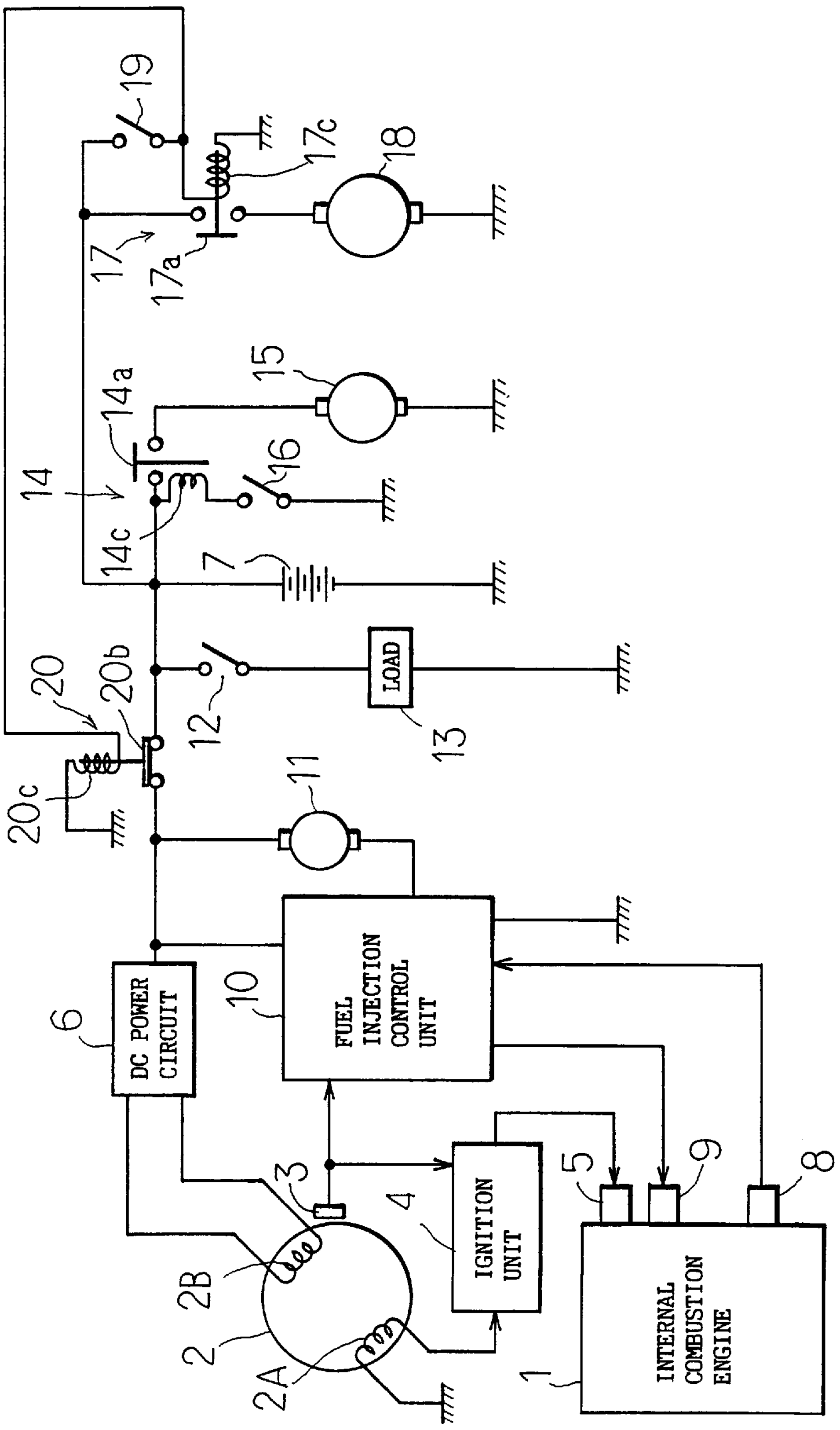
FIG. 1 is a circuit diagram showing an embodiment of a marine power device according to the present invention which is embodied in the form of a power device for an internal combustion engine for an outboard motor.

Referring first to FIG. 1, an embodiment of a marine power device according to the present invention is illustrated. In FIG. 1, reference numeral 1 designates an internal combustion engine acting as a prime mover for an outboard motor and 2 is a magneto driven by the internal combustion engine 1. The magneto 2 includes a magnet rotor (not shown) mounted on an output shaft of the internal combustion engine 1 and a stator including generating coils 2A and 2B. The generating coils 2A and 2B each are adapted to induce an AC voltage thereacross in synchronism with operation or rotation of the internal combustion engine 1.

Reference numeral 3 indicates a signal generator for generating a pulse signal in synchronism with rotation of the internal combustion engine 1, 4 is an ignition unit for the internal combustion engine 1, which ignition unit functions to generate a high voltage for ignition at an ignition timing of the internal combustion engine while using the generating coil 2A of the magneto 2 as a power supply therefor, and 5 is an ignition plug which is mounted on a cylinder of the internal combustion engine 1 and adapted to generate a spark when a high voltage is applied thereto from the ignition unit 4. Also, reference numeral 6 designates a DC power circuit for rectifying an AC voltage induced across the generating coil 2B of the magneto 2, to thereby output a DC voltage limited to a set level or below and 7 is a battery charged by the output of the DC power circuit 6.

The DC power circuit 6 includes a rectification circuit for rectifying the AC voltage outputted from the generating coil 2B and a voltage regulating circuit for restricting a DC voltage outputted from the rectification circuit to a set level or below. The DC power circuit 6 may be constructed by substituting a thyristor for a part of a full-wave rectification circuit constituted by diodes bridge-connected, so that the thyristor is subject to phase control so as to keep an output voltage of the full-wave rectification circuit at a set level or below. Alternatively, it may be constructed so as to include a rectification circuit and a switch circuit connected across the generating coil 2B, wherein when an output of the rectification circuit exceeds a set level, the switch circuit is turned on to short-circuit the generating coil 2B, to thereby limit the output voltage to the set level or below.

Such a voltage regulating function of the DC power circuit 6 prevents application of an overvoltage to the battery 7 during high to middle speed operation of the internal combustion engine, resulting in a voltage applied to the battery 7 being kept within an appropriate range.

The marine power device of the illustrated embodiment also includes a fuel injection control unit 10 and a pump motor 11 connected across the battery 7 which act as constantly-driven loads. The fuel injection control unit 10 functions to control a fuel injector 9 for injecting fuel into a fuel injection space such as an interior of a throttle body of the internal combustion engine, the above-described cylinder thereof or the like and the pump motor 11 functions to actuate a fuel pump (not shown) for feeding the injector 9 with fuel. In the illustrated embodiment, the fuel injection control unit 10 is provided therein with a switch for carrying out on-off control of a drive current fed to the pump motor 11, so that the switch is turned on to start feeding of the drive current to the pump motor 11 when a power voltage is applied to the fuel injection control unit 10.

The fuel injection control unit 10 is fed with data on a rotation angle of the internal combustion engine and a rotation speed thereof from the signal generator 3, as well as an output of a temperature sensor for detecting a temperature of the internal combustion engine and the like, resulting in operating a fuel injection period depending on control conditions such as the rotation speed and temperature of the internal combustion engine and the like. As a result, the fuel injection control unit 10 feeds the injector 9 with an injection command signal required for injecting fuel from the fuel injector 9 during the fuel injection period thus operated. The injector 9 is provided therein with a valve, which is kept open during a period of time for which the injector 9 is fed with the injection command signal, so that the injector 9 may inject fuel into the fuel injection space of the internal combustion engine. The amount of fuel fed to the internal combustion engine is determined by a product of the fuel injection period during which fuel is injected and a pressure of fuel fed to the injector 9 from a fuel pump actuated by the pump motor 11.

The fuel injection control unit 10 generally includes a microcomputer, which carries out an operation of the rotational speed and fuel injection period, control of feed of the injection command signal to the injector 9, and the like. For this purpose, the fuel injection control unit 10 is provided therein with a power circuit for converting an output voltage of the DC power circuit 6 into a constant DC voltage suitable for driving the microcomputer. Also, the microcomputer constituting a part of the fuel injection control unit 10 may be commonly used also as a control unit for controlling an ignition timing at which the ignition unit 4 carries out ignition operation.

The ignition unit 4, fuel injection control unit 10 and pump motor 11 each act as a constantly-driven load which is required to be kept at a constantly-driven state in order to continue rotation of the internal combustion engine.

The marine power device of the illustrated embodiment further includes a load 13 such as a lamp or the like and a starter motor 15 connected across the battery 7. The load 13 is driven through a load drive switch 12 as required. The starter motor 15 is connected through a contact 14*a* of a relay 14 across the battery 17 and operated for starting of the internal combustion engine. The relay 14 includes an excitation coil 14*c*, which is connected through a key switch 16 across the battery 7. The relay 14 and key switch 16 cooperate with each other to constitute a load drive switch for actuating the starter motor 15. When the key switch 16 is closed at the time of start of the engine, the excitation coil 14*c* is excited to close the contact 14*a*, to thereby permit a current to be fed from the battery 7 to the starter motor 15.

Figure 6B:
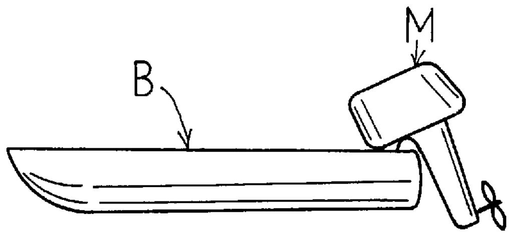
FIG. 6B is a schematic side elevation view similar to FIG. 6A except that a trim mechanism is actuated to incline an outboard motor.

The outboard boat shown in FIG. 6A in which the outboard motor M is used as a propelling equipment often encounters problems such as a reduction in navigation speed thereof due to an action of an underwater portion of the boat as a resistance during high-speed navigation thereof, planing of a bow of the boat during the high-speed navigation and the like. In order to avoid such problems, an inclination mechanism is provided for inclining the outboard motor M by means of a hydraulic cylinder, as shown in FIG. 6B. For arrangement of such an inclination mechanism, it is required that a motor which is called a trim motor and functions to actuate a hydraulic pump for feeding the hydraulic cylinder with hydraulic fluid is driven by means of a battery.

In the embodiment shown in FIG. 1, a trim motor 18 is connected through a contact 17*a* of a relay 17 across the battery 7. Also, the relay 17 has an excitation coil 17*c* connected across the battery 7 through a switch 19 operated manually or automatically. The relay 17 and switch 19 thus connected cooperate with each other to provide a load drive switch for driving the trim motor 18.

When the switch 19 is closed in order to incline the outboard motor M, the excitation coil 17*c* is excited to close the contact 17*a*, to thereby permit a drive current to be fed from the battery 7 to the trim motor 18, resulting in the trim motor being rotated or actuated. Such actuation of the trim motor 18 actuates a hydraulic pump (not shown) to feed hydraulic fluid to a hydraulic mechanism acting as a trim mechanism, so that the outboard motor M may be inclined as shown in FIG. 6B.

In the embodiment shown in FIG. 1, the load 13 such as a lamp or the like, the starter motor 15 and the trim motor 18 each are adapted to act as an occasionally-driven load driven as required.

The occasionally-driven loads include those driven for a limited period of time. The present invention includes a switch means which, when of the occasionally-driven loads, at least one specific occasionally-driven load selected or preselected from the occasionally-driven loads driven for a limited period of time is actuated, functions to isolate or separate the battery 7 and at least one or a part of the occasionally-driven loads from the magneto 2 so as to limit a load of the magneto 2 to a value equal to or below the maximum limitation level of the load which can be appropriately driven by the magneto. The switch means is arranged at a position which does not affect flowing of a drive current fed from the magneto to the constantly-driven loads.

In the illustrated embodiment, of the occasionally-driven loads, the trim motor 18 increased in consumption power and actuated only for a limited period of time is selected to be such a specific occasionally-driven load and a switch means 20 is interposedly arranged between the battery 7 and the rectification circuit 6 so as to be kept turned off, to thereby isolate or separate the battery 7 and occasionally-driven loads from the magneto while the trim motor 18 is actuated.

The switch means 20 may comprise an excitation coil 20*c* and contact 20*b* rendered open when the excitation coil 20*c* is excited. The excitation coil 20*c* is connected through the switch 19 across the battery 7 and the contact 20*c* is arranged on the way of a circuit for connecting an output terminal of the DC power circuit 6 on a positive pole side thereof and a positive electrode terminal of the battery 7 to each other.

In the embodiment shown in FIG. 1, the magneto 2, battery 13, switches 12, 16 and 19, relays 14 and 19, and switch means 20 cooperate with each other to provide the power device.

In the marine power device of the embodiment shown in FIG. 1, the switch 19 is kept open during operation of the internal combustion engine and the contact 20*b* of the relay constituting the switch means 20 is kept closed while the trim motor 18 is separated from the power device. At this time, an AC voltage outputted from the generating coil 2B of the magneto 2 is rectified by the rectification circuit arranged in the DC power circuit 6 and then fed to the battery 7, resulting in the battery 7 being charged. Also, output voltages of the battery 7 and DC power circuit 6 are applied to the fuel injection control unit 10 and pump motor 11 each acting as the constantly-driven load, so that they may be normally operated, to thereby ensure that the engine is smoothly operated.

When the switch 19 is closed during operation of the engine, the contact 20*b* of the relay constituting the switch means 20 is rendered open, so that the battery 7 and the occasionally-driven loads connected to the battery 7 are separated from the magneto 2. In this state, the fuel injection control unit 10 and pump motor 11 are driven through the DC power circuit 6 by means of an output voltage of the magneto 2 irrespective of a state of the battery 7, so that smooth operation of the engine may be ensured, even when the battery 7 is exhausted to a degree sufficient to cause a voltage across the battery 7 to be substantially reduced when the trim motor 18 is actuated. Actuation of the trim motor 18 is carried out only for a limited period of time and opening of the switch 19 permits charging of the battery 7 to be restarted, so that the charging may be effectively accomplished without any trouble.

The embodiment of FIG. 1 has a disadvantage that at the time when the contact 20*b* is open, arc occurs at the contact 20*b* to exhaust the contact 20*b*, to thereby deteriorate a life of the switch means 20. In order to avoid the disadvantage, the present invention may be constructed in such a manner as shown in FIG. 2, which illustrates another embodiment of a marine power device according to the present invention.

Figure 2:
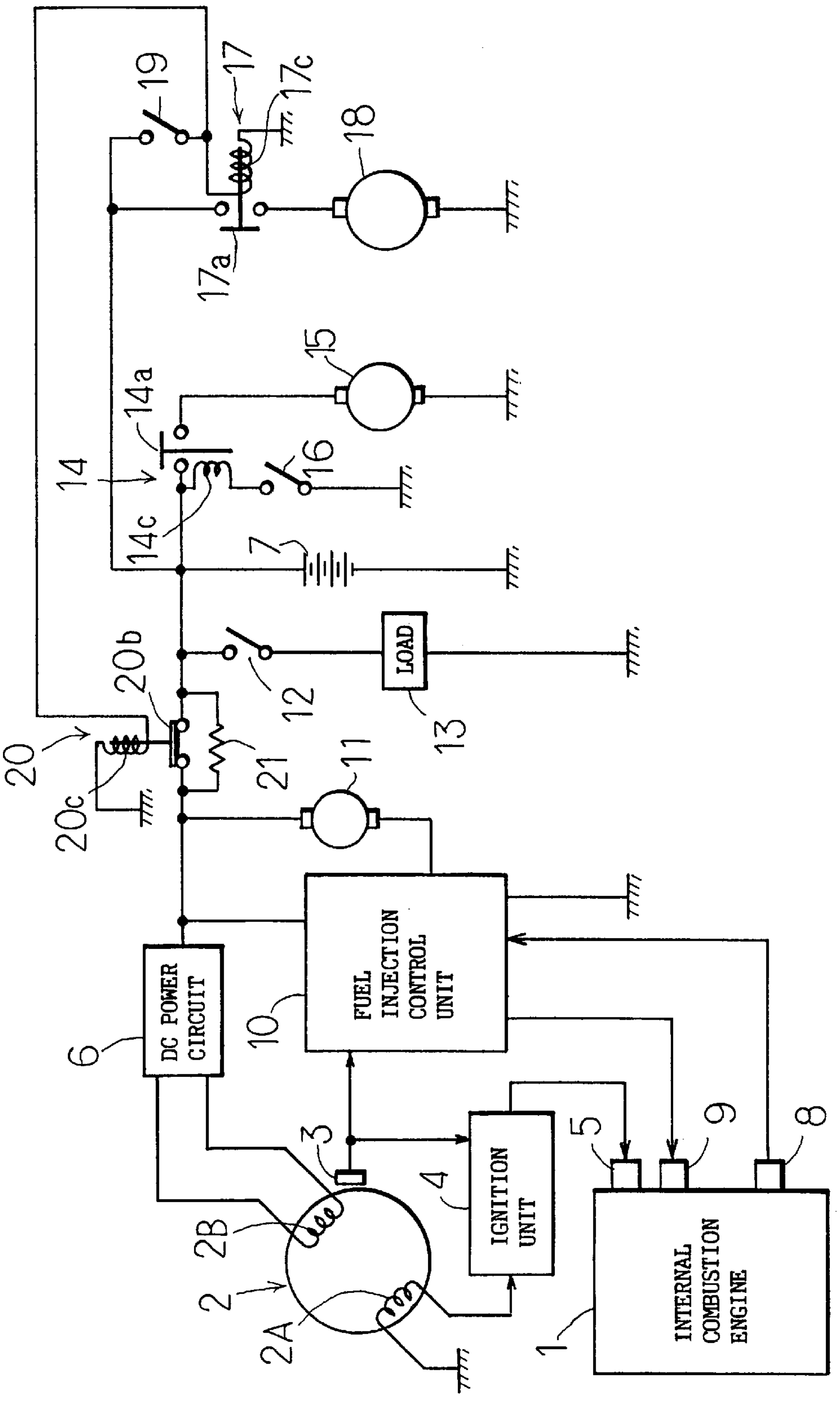
FIG. 2 is a circuit diagram showing another embodiment of a marine power device according to the present invention which is likewise embodied in the form of a power device for an internal combustion engine for an outboard motor.

In the embodiment of FIG. 2, an arc-extinguishing resistor 21 is connected across a contact 20*b*, to thereby suppress occurrence of arc when the contact 20*b* is open. Such connection of the arc-extinguishing resistor 21 in the embodiment of FIG. 2 permits a voltage corresponding to the sum of a voltage across a battery 7 and a voltage drop across the resistor 21 to be applied to constantly-driven loads, so that a voltage equal to the voltage across the battery 7 or more may be applied to the constantly-driven loads. Thus, the constantly-driven loads may be normally operated, to thereby ensure smooth rotation of an internal combustion engine, even when the voltage across the battery 7 is reduced.

In the embodiment shown in FIG. 2, a fuel injection control unit 10 and a pump motor 11 each act as the constantly-driven lead.

The remaining part of the embodiment shown in FIG. 2 may be constructed in substantially the same manner as the embodiment of FIG. 1.

In each of the embodiments described above, the switch means 20 is constructed of a relay. Alternatively, it may comprise a semiconductor switch.

Also, the embodiments described above each are so constructed that the switch means 20 is rendered open when at least one specific occasionally-driven load selected from the occasionally-driven loads driven only for a limited period of time which are included in the occasionally-driven loads is actuated. Alternatively, it may be constructed so as to detect a voltage across the battery 7, to thereby open the switch means 20 when the voltage reaches a level below a set value.

Figure 3:
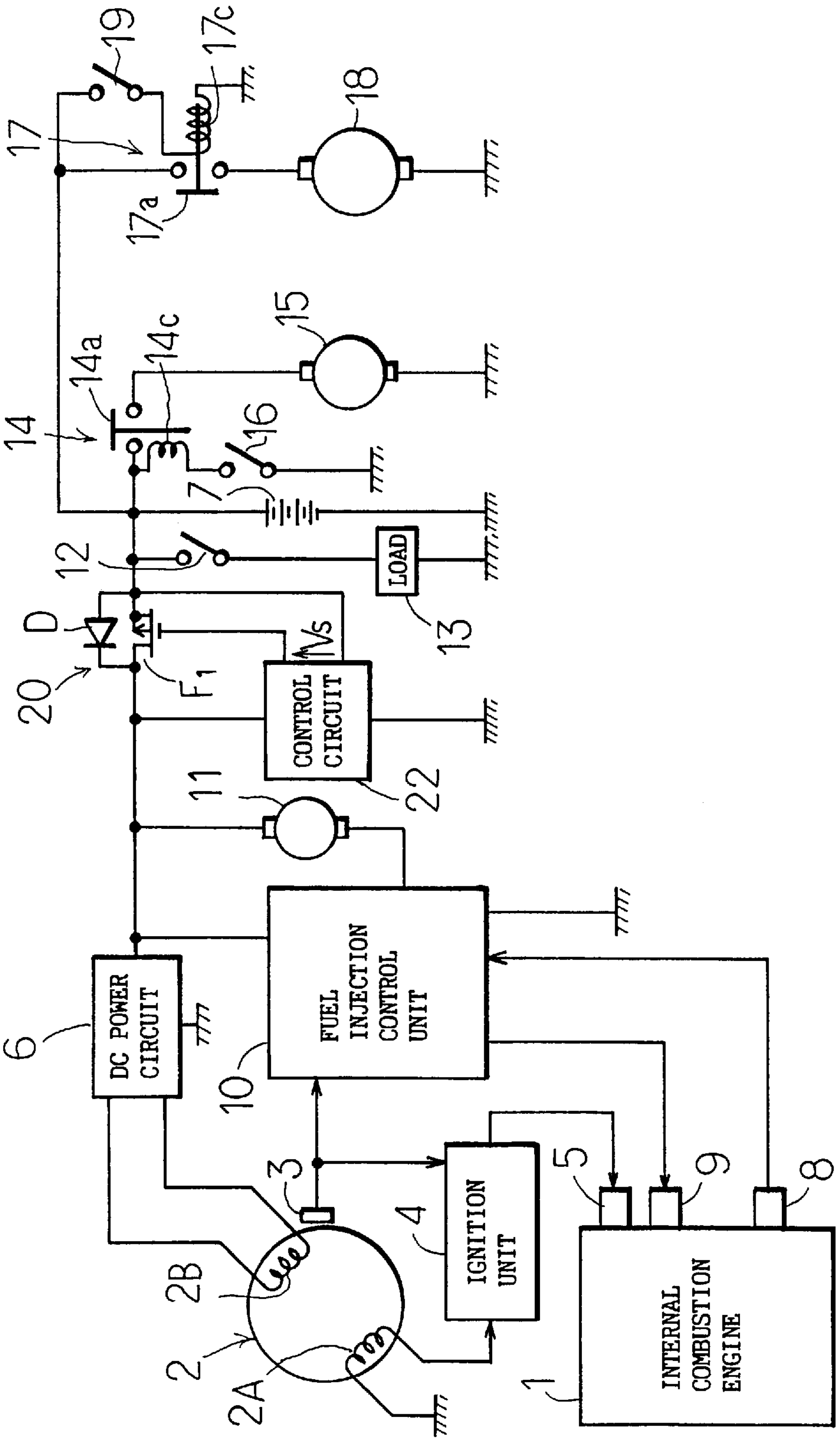
FIG. 3 is a circuit diagram showing a further embodiment of a marine power device according to the present invention which is likewise embodied in the form of a power device for internal combustion engine for an outboard motor.

Referring now to FIG. 3, a further embodiment of a marine power device according to the present invention is illustrated, which is constructed in such a manner to open a switch means 20 when a voltage across a battery 7 reaches a level below a set value. In the illustrated embodiment, the switch means 20 is constructed of a MOSFET F1 of the P channel type, of which a drain-source circuit is connected to an output terminal of a DC power circuit on a positive pole side thereof and a positive electrode of the battery 7, respectively. Reference character D designates a parasitic diode connected to a drain-source circuit of the FET F1. A voltage between a drain of the FET F1 and a ground of the battery 7 or a negative electrode thereof is inputted to a control circuit 22, of which an output terminal is connected to a gate-cathode circuit of the FET F1. The control circuit 22 functions to detect a voltage across the battery 7 through the parasitic diode D, resulting in feeding the gate-cathode circuit of the FET F1 with a drive signal Vs to keep the FET turned on when the voltage across the battery 7 reaches a set level or above and extinguishing the drive signal Vs to keep the FET F1 turned off when the voltage is below the set level.

In the embodiment of FIG. 3, the switch means 20 is constructed of a MOSFET of the P channel type. Alternatively, it may comprise a MOSFET of the N channel type.

A relay may be suitably used for the switch means 20 even when the switch means is subject to on-off operation depending on a voltage across the battery 7 as shown in FIG. 3.

The remaining part of the embodiment shown in FIG. 3 may be constructed in substantially the same manner as the embodiment of FIG. 1.

When the greatest importance is placed on rotation of the internal combustion engine; the present invention, as described above, is preferably constructed so that when of the occasionally-driven loads, at least one specific occasionally-driven load driven only for a limited period of time is actuated, all occasionally-driven loads are separated from the magneto, to thereby ensure feeding of an electric power from the generating coil 2B of the magneto to only the constantly-driven loads. In each of the above-described embodiments, the specific occasionally-driven load is the trim motor 18. Nevertheless, in the present invention, it is merely required that the switch means 20 is arranged so as to be kept turned off for a period of time during which the specific load preselected is actuated, resulting in separating the battery 7 and at least one or a part of the occasionally-driven loads from the magneto, to thereby limit a load of the magneto to a value equal to or below the maximum limitation level of the load which can be appropriately driven by the magneto. Thus, it is not necessarily required that the switch means 20 is arranged so as to separate all occasionally-driven loads from the magneto 2.

Figure 4:
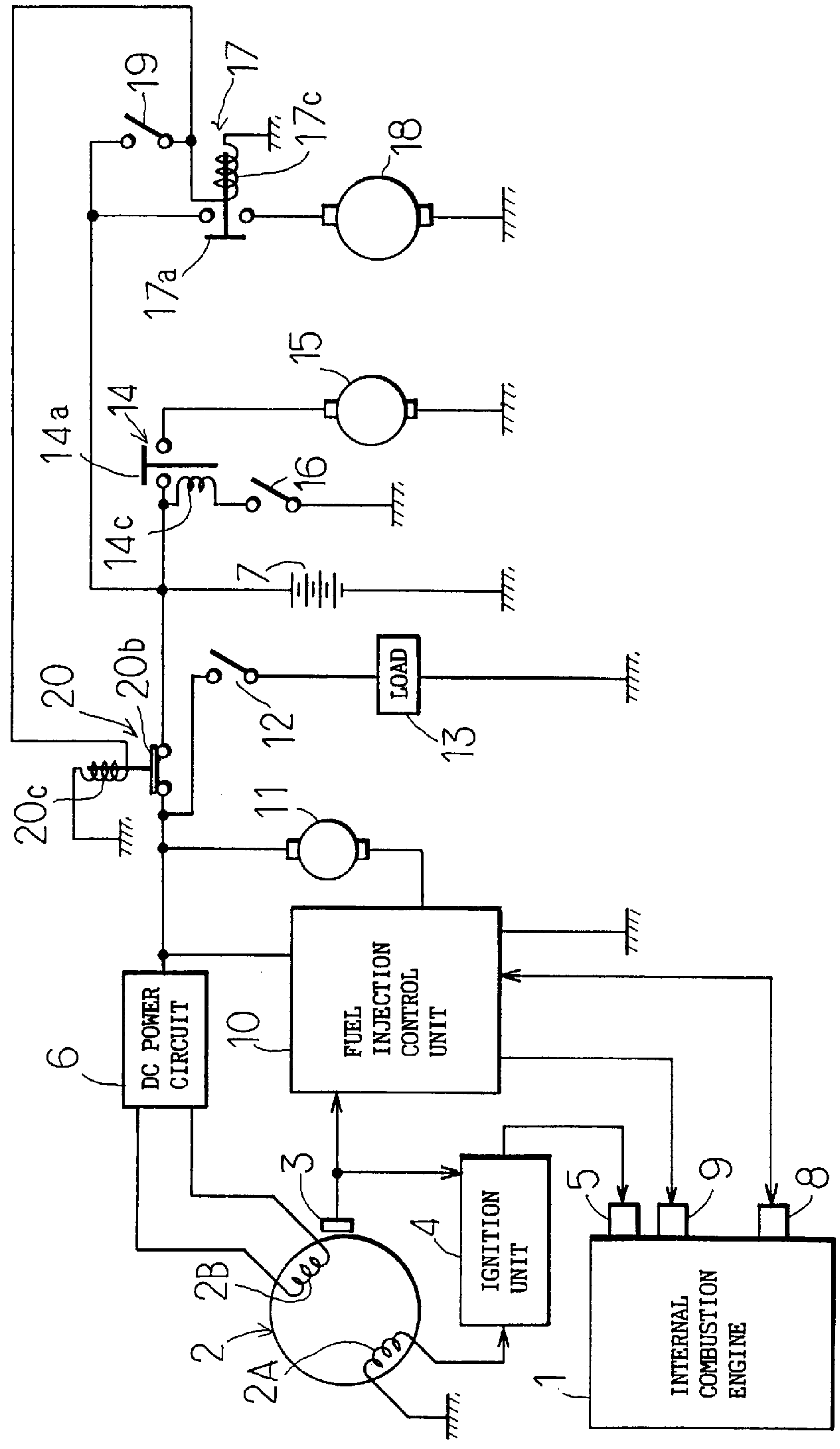
FIG. 4 is a circuit diagram showing still another embodiment of a marine power device according to the present invention which is likewise embodied in the form of a power device for an internal combustion engine for an outboard motor.

For example, when the constantly-driven loads 10 and 11 are smoothly actuated even when the load 13 is connected to the magneto 13 while keeping the battery 7 separated from the magneto 2, the present invention may be constructed in such a manner as shown in FIG. 4, which illustrates still another embodiment of a marine power device according to the present invention.

More particularly, in the embodiment of FIG. 4, a load 13 is connected to a circuit on a side of a DC power circuit 6 or on a side of a magneto 2 rather than to a switch means 20. This is true of the case that a voltage across a battery 7 is detected to control the switch means 20. The remaining part of the illustrated embodiment may be constructed in substantially the same manner as the embodiment of FIG. 1.

Figure 5:
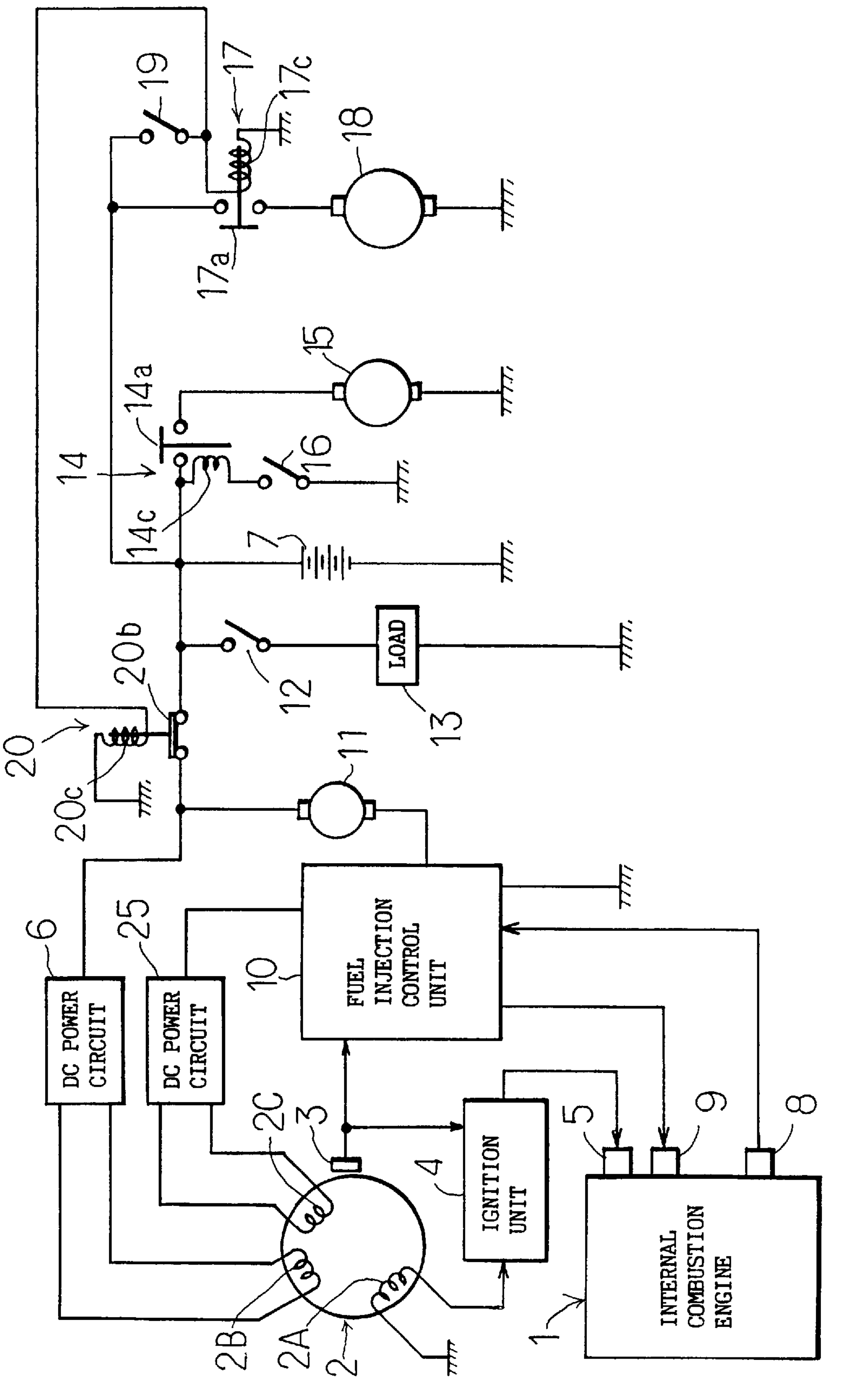
FIG. 5 is a circuit diagram showing a still further embodiment of a marine power device according to the present invention which is likewise embodied in the form of a power unit for an internal combustion engine for an outboard motor.

The embodiments shown in FIGS. 1 to 4 each are so constructed that a charging current is fed from the single generating coil 2B arranged in the magneto 2 through the DC power circuit 6 to the battery 7 and a drive current is fed from the DC power circuit 6 to the fuel injection control unit 10 and pump motor 11 each acting as the constantly-driven load, as well as to the load 13, trim motor 15 and starter motor 18 each acting as the occasionally-driven load. However, the present invention is not limited to such construction. For example, the present invention may be constructed in such a manner as shown in FIG. 5, which illustrates a still further embodiment of a marine power device according to the present invention. In the embodiment of FIG. 5, an additional generating coil 2C is arranged in a magneto 2, so that an output of the generating coil 2C may be applied through a DC power circuit 25 to a power terminal of a fuel injection control unit 10. The DC power circuit 25 includes a rectification circuit for rectifying an output of the generating coil 2C and a voltage regulating circuit for regulating an output voltage of the rectification circuit, so that a DC voltage limited to a set level or below may be applied to the power terminal of the fuel injection control unit 10. The remaining part of the embodiment shown in FIG. 5 may be likewise constructed in substantially the same manner as the embodiment of FIG. 1.

In the present invention, the occasionally-driven loads are not limited to those in each of the embodiments described above. The present invention may be also applied to the case that a motor for actuating a pump for applying a hydraulic pressure to a hydraulic cylinder of a hydraulic lift for vertically moving the whole outboard motor, a motor for actuating a pump for applying a hydraulic pressure to a power assisting unit for assisting operation of a steering wheel by means of a hydraulic pressure in order to reduce force required for operation of the steering wheel, a motor for actuating a bilge pump, a motor for actuating a winding machine for winding up an anchor or a net, or the like constitutes the occasionally-driven load.

As can be seen from the foregoing, the present invention is so constructed that the battery and at least a part of the occasionally-driven loads are separated from the magneto, to thereby limit a load of the magneto to a drive limitation of the magneto or below when there is likelihood that the battery fails to feed the constantly-driven loads with a drive current required. Such construction effectively prevents interruption of the internal combustion engine due to a failure in driving of the constantly-driven loads required for continuing operation of the engine.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A marine power device comprising:

a magneto arranged so as to be driven by an internal combustion engine used as a prime mover for an outboard motor and constructed so as to feed a drive current to constantly-driven loads kept under constantly-driven conditions for continuing operation of said internal combustion engine and occasionally-driven loads driven as required;

a battery arranged so as to be charged by an output of said magneto and constructed so as to feed a drive current to said constantly-driven loads and occasionally-driven loads; and a switch means for separating said battery and at least one of said occasionally-driven loads from said magneto so as to limit the magnitude of load applied to said magneto to a value equal to or below the maximum limitation level of the load which is capable of being appropriately driven by said magneto when there is likelihood that said battery is decreased in output voltage thereof, to thereby fail to feed said constantly-driven loads with a drive current required;

said switch means being arranged at a position which does not affect flowing of a drive current fed from a side of said magneto to said constantly-driven loads.

2. A marine power device comprising:

a magneto arranged so as to be driven by an internal combustion engine used as a prime mover for an outboard motor and constructed so as to feed a drive current to constantly-driven loads kept under constantly-driven conditions for continuing operation of said internal combustion engine and occasionally-driven loads driven as required;

a battery arranged so as to be charged by an output of said magneto and constructed so as to feed a drive current to said constantly-driven loads and occasionally-driven loads; and a switch means kept turned off during a period of time for which of said occasionally-driven loads, at least one specific occasionally-driven load preselected from the occasionally-driven loads driven only for a limited period of time is actuated, resulting in separating said battery and at least one of said occasionally-driven loads other than said specific occasionally-driven load from said magneto so as to limit the magnitude of load applied to said magneto to a value equal to or below the maximum limitation level of the load which is capable of being appropriately driven by said magneto;

said specific occasionally-driven load being a load which is likely to cause a voltage across said battery to be reduced below a level required for driving said constantly-driven loads when it is actuated;

said switch means being arranged at a position which does not affect flowing of a drive current fed from a side of said magneto to said constantly-driven loads.

3. A marine power device as defined in claim 2, wherein said occasionally-driven loads are provided with individual load drive switches, through which a voltage across said battery is applied to said occasionally-driven loads, respectively; and said switch means comprises a relay excited during a period of time for which the load drive switch for said specific occasionally-driven load is turned on, resulting in a contact thereof being open.

4. A marine power device as defined in claim 2, wherein said occasionally-driven loads are provided with individual load drive switches, through which a voltage across said battery is applied to said occasionally-driven loads, respectively; and said switch means comprises a semiconductor switch which is subject to on-off control depending on a state of the load drive switch for said specific occasionally-driven load so as to be kept turned on while said load drive switch is turned off and kept turned off while it is turned on.

5. A marine power device comprising:

a magneto arranged so as to be driven by an internal combustion engine used as a prime mover for an outboard motor and constructed so as to feed a drive current to constantly-driven loads kept under constantly-driven conditions for continuing operation of said internal combustion engine and occasionally-driven loads driven as required;

a battery arranged so as to be charged by an output of said magneto and constructed so as to feed a drive current to said constantly-driven loads and occasionally-driven loads; and a switch means rendered turned off when a voltage across said battery is reduced below a set level, resulting in separating said battery and at least a part of said occasionally-driven loads from said magneto so as to limit a load connected to said magneto to a value equal to or below the maximum limitation level of the load which is capable of being appropriately driven by said magneto;

said switch means being arranged at a position which does not affect flowing of a drive current fed from a side of said magneto to said constantly-driven loads.

6. A marine power device comprising:

a magneto arranged so as to be driven by an internal combustion engine used as a prime mover for a marine propelling equipment of an outboard motor and constructed so as to feed a drive current to constantly-driven loads including a fuel injection control unit for controlling an injector for feeding said internal combustion engine with fuel and a pump motor for actuating a fuel pump for feeding said injector with fuel and occasionally-driven loads including a starter motor for starting said internal combustion engine and a trim mechanism for adjusting an inclination angle of said marine propelling equipment;

a DC power circuit for rectifying an output of said magneto to output a DC voltage of a set level or below;

a battery arranged so as to be charged by the output of said magneto and constructed so as to feed said constantly-driven loads and occasionally-driven loads with electric power;

load drive switches individually arranged for said occasionally-driven loads to carry out on-off control of a current fed from said battery to said occasionally-driven loads, respectively; and a switch means kept turned off while the load drive switch for said trim motor is turned on, resulting in separating said battery and at least said trim motor from said magneto so as to limit the magnitude of load applied to said magneto to a value equal to or below the maximum limitation level of the load which is capable of being appropriately driven by said magneto;

said switch means being arranged at a position which does not affect flowing of a drive current fed from a side of said magneto to said constantly-driven loads.

7. A marine power device comprising:

a magneto arranged so as to be driven by an internal combustion engine used as a prime mover for a marine propelling equipment of an outboard motor and constructed so as to feed a drive current to constantly-driven loads including a fuel injection control unit for controlling an injector for feeding said internal combustion engine with fuel and a pump motor for actuating a fuel pump for feeding said injector with fuel and occasionally-driven loads including a starter motor for starting said internal combustion engine and a trim motor for actuating a trim mechanism for adjusting an inclination angle of said marine propelling equipment;

a DC power circuit for rectifying an output of said magneto to output a DC voltage of a set level or below;

a battery arranged so as to be charged by the output of said magneto and constructed so as to feed said constantly-driven loads and occasionally-driven loads with an electric power; and a switch means rendered turned off when a voltage across said battery is reduced below a set level, resulting in separating said battery and at least said trim motor from said magneto so as to limit the magnitude of load applied to said magneto to a value equal to or below the maximum limitation level of the load which is capable of being appropriately driven by said magneto;

said switch means being arranged at a position which does not affect flowing of a drive current fed from a side of said magneto to said constantly-driven loads.

* * * * *